June 14, 1955      W. E. DION      2,710,933

FOLLOW-UP CONTROL SYSTEM

Filed June 21, 1951      3 Sheets-Sheet 1

INVENTOR.
WARREN E. DION

BY

*E.C. Sanborn*

ATTORNEY

June 14, 1955    W. E. DION    2,710,933
FOLLOW-UP CONTROL SYSTEM
Filed June 21, 1951.    3 Sheets-Sheet 2

$a$ = CONSTANT
$b$ = VARIABLE    FIG. 2
$c', c''$ = INTERMITTENT

INVENTOR.
WARREN E. DION
BY
E. C. Sanborn
ATTORNEY

June 14, 1955

W. E. DION 2,710,933

FOLLOW-UP CONTROL SYSTEM

Filed June 21, 1951

INVENTOR.
Warren E. Dion
BY
E. C. Sanborn
Attorney

United States Patent Office 2,710,933
Patented June 14, 1955

2,710,933

FOLLOW-UP CONTROL SYSTEM

Warren E. Dion, Bristol, Conn., assignor to The Bristol Company, Waterbury, Conn., a corporation of Connecticut Application June 21, 1951, Serial No. 232,739

22 Claims. (Cl. 318—29)

This invention relates to servomotor systems, and more especially to such a system adapted to the setting of control members, valves, etc., in aircraft and other installations where the available power supply is restricted, and where considerations of ruggedness, low weight, compactness, dependability, and ready replaceability are paramount. The system is applicable to remote positioning of control instrumentalities in response to either a manually determined setting of an element located presumably at a distance from the object to be moved, or to conditions in an electrical network whose balance is made subject to a change in a variable to be measured and/or controlled. The principles of the invention are applicable also to signalling and to telemetering.

In electrical servomotor systems of the class wherein the present invention lies, it has been found expedient to make use of a balanceable network, whereby a follow-up action is obtained by the use of two variable voltage-dividing impedances incorporated in a bridge network or its equivalent, one of said impedances being manually or otherwise varied to establish the desired setting of the object to be moved, and the other being mechanically attached to said object to be adjusted thereby, and thus to rebalance the electrical network initially unbalanced by the first named impedance. Where alternating current is available, systems of this nature are especially applicable, and such unbalanced condition as may exist in the network is readily detected, and if necessary amplified, by means of conventional electronic apparatus and/or other relay means for actuation of a balancing servomotor. While in the interest of simplicity the primary control circuit is herein described as a bridge network composed of suitably proportioned resistance units, it will be apparent to those versed in the art that where alternating current energization is available these may be wholly or partially replaced by impedances of the reactive type.

In the operation of servomotors in general, and more particularly those responsive to conditions in balanceable electrical networks, there are encountered two operational faults which have a tendency to restrict the applications of such apparatus. These are (1) "overshooting" or hunting as the balance point is approached, and (2) uncertainty of performance, and the possibility of the introduction of hazardous conditions, in the event of failure of electric components in the system. In meeting the first of these conditions many expedients have been developed, but in almost every instance they demand accessory equipment which complicates the basic control assembly and proportionally adds to its bulk, weight, complication, and cost. Accessories for overcoming the second of these limitations are subject to similar objections.

It is an object of the present invention to provide in a servomotor system of the class embodying a balanceable network means for effecting a balance in said network in a minimum of time, and without overshooting the balance point.

It is a further object to provide means of the above nature wherein the performance shall not be adversely affected by wide variations in supply voltage or mechanical loading.

It is a further object to provide means of the above nature which shall be flexible in its application, whereby it may readily be adapted to motors of different types, ratings and characteristics with a minimum of redesign or modification.

It is a further object to provide a servomotor system of the above class, wherein upon failure of electrical components, or breakage or short-circuiting or accidental grounding, of wires in the control circuit, the motor and devices driven thereby shall be brought to a condition of rest.

It is a further object, in accomplishing the foregoing purposes of the invention, to coordinate as far as practicable a plurality of more or less discrete functions in certain components of the system, whereby the required results are obtained with a minimum of accessory apparatus and devices, thus reducing both weight and cost, with a concomitant simplification of circuits and interconnections.

It is a further object to provide a servomotor control system wherein practically all components are simple inexpensive units of standard design, readily available on the open market.

In carrying out the purposes of the invention, it is proposed to utilize the inactive neutral zone which in general characterizes all forms of automatic control. If all conditions, such as load, speed, supply voltage, distance of travel, friction, etc., characterizing the operation of the motor, could be maintained absolutely constant, it would be quite practicable to utilize this neutral zone to offset the inertia of the motor and mechanical elements connected thereto, so that the "coasting" effect would result in substantially critical performance; but, because of the variables inseparable from operating conditions, it becomes necessary to introduce corresponding variations in the driving and the retarding influences. In the present invention this result is accomplished by superimposing upon the characteristic neutral zone or "deadband" of the basic control two modifications, one of these being in the nature of a definite broadening of the deadband intermittently applied according to the operation of the motor, and the other being a variable increment whose magnitude is dependent upon electrical conditions in the control circuit. The nature and inter-relation of these de-sensitizing influences will subsequently be discussed in greater detail.

In order to effect the foregoing results, it is proposed to utilize primarily the inherent characteristics of conventional forms of electron discharge tubes in combination, and by suitably coordinating these with devices characterized by unilateral electrical conductivity and with other circuit components, to accomplish both the stabilizing of operation and the "fail-safe" objects of the invention with a minimum of modification from the basic servomotor circuit. It is further proposed so to integrate the several components of the system that the stabilizing function is effected with a dual characteristic whereby both great and relatively small departures from the ultimate balance are eliminated with a minimum deviation from critical performance. The manner in which these results are obtained will be explained more fully after preliminary consideration of the arrangement and performance of a preferred form of basic control system to which the principles of the invention are especially adaptable.

Figures 1, 4, 6:
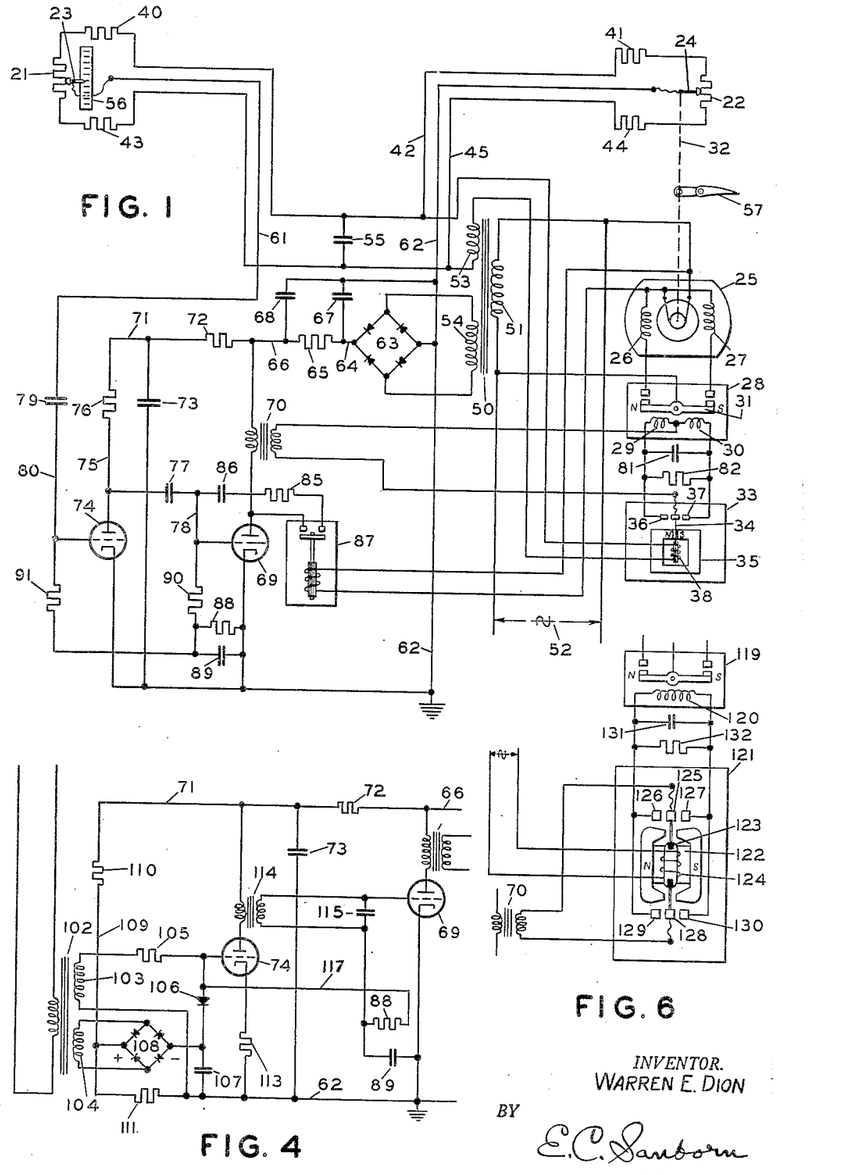
Fig. 1 is a diagrammatic representation of a positioning system utilizing the principles of the invention.
Figs. 4 and 5 are diagrams illustrating alternative arrangements of certain details shown in Fig. 3.
Figs. 6 and 7 show alternative forms of relay-contactor arrangements which may be employed in lieu of that shown in Fig. 1.

In the form of the invention shown in Fig. 1, slide-wires 21 and 22, provided respectively with continuously translatable contactors 23 and 24, comprise the transmitting and restoring elements respectively of a bridge network adapted to control the operation of an electric motor 25. This motor may be of any one of a variety of types, and is here shown as of the series-commutating class, adaptable to operation from either a direct-, or an alternating-current, power source, and having an armature and two independent and opposed field windings 26 and 27 with a common connection to one terminal of the armature. The free terminals of said field windings are connected respectively to the contacts of a three-position neutral-seeking polarized relay 28. This relay is provided with two windings 29 and 30, and with an armature 31, magnetically polarized and adapted for deflection through a limited angle according to the polarity of the unidirectional component of current flowing in either or both of the windings 29 and 30, so that a common connection provided by said armature will electrically engage one or the other of said motor windings according to the sense of relay deflection, to energize said motor for operation in a corresponding direction when connections to an electric power source are completed as presently to be set forth. Suitable mechanical means 32 connect the motor 25 to the movable contactor 24, whereby to translate the latter with operation of the motor.

Figure 9:
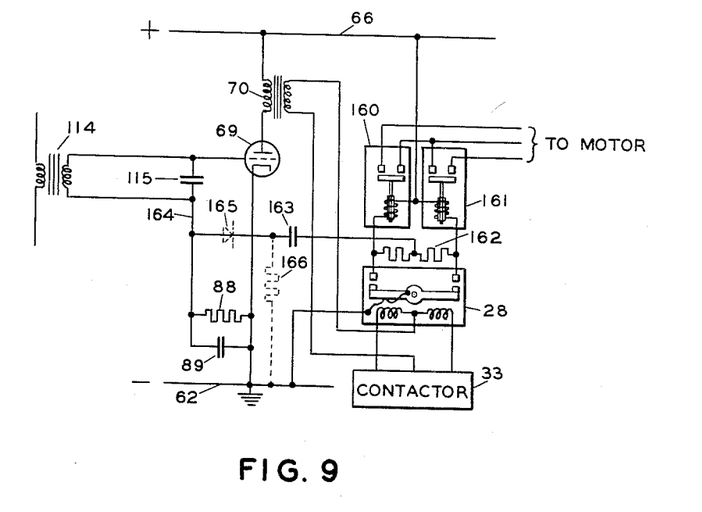
Figs. 9 and 10 are diagrams showing further alternative arrangements of circuits adaptable to purposes of the invention.

Interposition of "power" relays between the polarized relay and the motor windings is shown in Fig. 9; and it will be understood that omission thereof from earlier-discussed embodiments is but an obvious expedient in the interest of clarity, and not in any way affecting the spirit of the invention.

A synchronous contactor 33 is provided with a movable armature 34 polarized by a permanent magnet 35 or its equivalent, and adapted to oscillate between two contacts 36 and 37 under the influence of energization by alternating current flowing in a winding 38, whereby to connect said armature alternately to said contacts, thereby performing the function of a single-pole double-throw switch operating synchronously with the current in said winding.

Connected between one extremity of the slide-wire resistor 21 and one extremity of the slide-wire 22 are two resistors 40 and 41 having an intermediate conductor 42; and between the other extremities of said slide-wires respectively are two resistors 43 and 44 having an intermediate conductor 45. For reasons presently to be set forth, the resistors 40, 41, 43 and 44 should be of substantially higher value than the slide-wires with which they are associated; and, by way of example, each of said resistors may have a value of the order of twelve times that of the adjacent slide-wire.

A transformer 50 is provided with a primary winding 51 adapted for energization from an alternating-current source 52, and with two mutually isolated secondary windings 53 and 54, the former of which is connected to the conductors 42 and 45, and in series with the winding 38 of the contactor 33, and the latter of which is utilized in a manner hereinafter to be set forth. The series connection of the winding 38 and the current supply to the network comprising the slide-wires 21 and 22 and associated resistors assures that the excitation of the oscillating armature of said contactor, and hence its contact action, will bear a definite phase relation to the potentials existing in the network; and, should it be found necessary to establish initially, or to modify, said phase relationship, such adjustment may readily be effected by the connection of a suitable capacitor 55 between the conductors 42—45.

The slide-wire 21, provided with a graduated scale 56, whereby the translated position of the contactor 23 may be defined, comprises a transmitting unit for the positioning system under consideration, and may be located where the contactor may be manually positioned with respect to the slide-wire for the purpose of actuating the system. The slide-wire 22, obviously located near the motor 25, is actuated thereby, through the mechanism 32. In order to obtain maximum advantage from the "fail-safe" characteristics of the installation, the resistors 40 and 43 directly associated with the slide-wire 21, should be located as close thereto as practicable; and similarly the resistors 41 and 44 should be located close to the slide-wire 22. The network comprising said slide-wires and resistance units will be recognized as a bridge system adapted to alternating-current energization from the transformer secondary 53, and wherein a condition of unbalance will be manifested in an alternating potential appearing between the contactors 23 and 24, so that a disturbance of balance due to shifting of one of said contactors along the corresponding slide-wire may be corrected by moving the other contactor with respect to its associated slide-wire. Movable by the motor 25 and adapted to be displaced in direct correspondence with changes in position of the contactor 24 is an object 57 whose position is to be controlled. This object may be an aileron, throttle, or other movable part of the control system of an aircraft, or it may be a valve or indicator or other shiftable part of an industrial regulating system. The contactor 23 is adapted to manual displacement along the slide-wire 21 and is provided with an index or pointer whereby there may be obtained an indication of its translated position with respect to the graduated scale 56. Thus, by providing a suitable detector and amplifier system, whereby alternating potentials appearing between the contactors 23 and 24 may be rendered effective to control the direction and intensity of operation of the motor 25 to reduce said potentials to zero, the position of the object 57 may be remotely controlled in accordance with selected positions of the contactor 23; and it is to improvements in such a detector and amplifier system as now to be described, that the present invention is specifically directed.

To the contactor 23 associated with the slide-wire 21 is attached a conductor 61; and to the contactor 24 associated with the slide-wire 22 is attached a conductor 62, which is connected to ground and provides a ground bus for the detector system. The secondary winding 54 of the transformer 51 is connected to the input terminals of a rectifier 63 having its negative output terminal connected to the ground conductor 62 and its positive output terminal connected to a conductor 64, thence in series with a suitable resistor 65 to a conductor 66; and from said last-named conductors connection is made through capacitors 67 and 68 respectively to ground conductor 62. The rectifier 63 thus constitutes a unidirectional power source; and, by virtue of the combined action of the resistor 65 and the capacitors 67 and 68, the alternating component of the rectifier output is substantially eliminated, providing a direct potential between the conductor 66 and the ground conductor 62.

An electron discharge device 69, which may be a triode, having a cathode, an anode and a control grid, is arranged with its cathode connected to the ground conductor 62 and its anode to the conductor 66 in series with the primary winding of a suitable coupling transformer 70. A conductor 71 is connected to the conductor 66 through a series resistor 72 and to the ground conductor 62 through a capacitor 73, whereby to eliminate residual alternating components from the potential between said conductors 71 and 62.

An electron discharge device 74 having a cathode, an anode and a control grid, is arranged with its cathode connected to the conductor 62 and its anode to a conductor 75 and thence in series with a resistor 76 to the conductor 71. The conductor 75 is connected through a capacitor 77 to a conductor 78 and thereby to the control grid of triode 69. The conductor 61, leading from the slide-wire contact 23, is connected through a blocking capacitor 79 to a conductor 80 and thereby to the control grid of the tube 74. In detecting the signal from the bridge network, and transmitting it to the transformer 70, the triodes 74 and 69, each with its immediately associated components, may be considered respectively as first, and second, stages of amplification.

As previously noted, the primary winding 51 of the transformer 50 is connected to a suitable alternating-current source 52 for energization therefrom. The free terminal of the armature of the motor 25 and the contacts carried by the armature of the relay 28, are respectively connected to the two sides of a power source suited to the type and the rating of said motor, this, for simplicity, being indicated in the drawing as the alternating-current supply 52, but, as will be evident to those versed in the art of control, not in any sense so restricted.

The apparatus as thus set forth would be operative to perform the basic function of balancing the network including the slide-wires 21 and 22; and the performance may be briefly outlined as follows. Upon the application of power to the system from the alternating-current source 52, the transformer 50 will become energized. The secondary winding 53 of the transformer will energize the bridge network; but, for reasons hereinafter to be set forth, a large proportion of the applied voltage will be absorbed in the resistors 40, 41, 43 and 44, leaving a relatively small potential across each of the slide-wires 21 and 22.

The secondary winding 54 will energize the rectifier 63, causing a potential having a pronounced unidirectional component to appear between the conductors 64 and 62. By virtue of the filtering action of the capacitors 67 and 68, a large part of the alternating component of said potential will be eliminated, leaving a substantially direct potential between the conductors 66 and 62.

An unbalanced condition in the bridge network including the slide-wires will result in the appearance of an alternating potential between the conductors 61 and 62, i. e. between the conductor 61 and ground. This potential will be applied through the blocking capacitor 79 to the control grid of the electron tube 74, causing a corresponding alternating component to appear in the plate or anode current of said tube drawn from the conductor 66 through the resistors 72 and 76 in series. The corresponding alternating potential of the conductor 75 with respect to the conductor 62 will be applied through the capacitor 77 and the conductor 78 to the control grid of the triode 69 introducing an alternating component in its plate current. This alternating component flowing through the primary winding will induce a corresponding voltage in the secondary winding of the transformer 70, which potential will be impressed upon the divided circuit including the coils 29 and 30 in the relay 28 and the contacts of the synchronous contactor 33. The synchronous oscillation of said contactor will produce a "chopping" action on the output of the transformer 70; and, with the phase relation of said oscillation properly established relative to the potentials in the bridge network (as may be effected by suitable coordination of the capacitor 55 with other elements of the circuit), half-wave rectification of said output will take place, alternate pulses being caused to pass through the respective windings 29 and 30. The polarities of said windings being suitably selected with respect to that of the magnetized armature 31, the effect thereon will be the substantial equivalent of a fully rectified current in a single winding, and the armature will be deflected from its neutral position in a direction depending on the equivalent polarity of said rectified current, that is to say, upon the phase position of the transformer output with respect to the potential impressed upon the bridge network.

Operation of the relay 28 will be improved by shunting the series connected coils 29—30 by a capacitor 81 and a resistor 82 in parallel, the former tending to smooth the current flow in the relay windings and minimize chatter, and the latter providing a load for the transformer 70 and eliminating severe surges attendant upon the momentary opening of the contacts in the synchronous contactor.

Since the motor 25 is operatively subject to the relay 28, it follows that said motor may be caused to operate in a direction depending upon the sense of unbalance in the bridge network, and hence, that, by suitably selecting and interrelating polarities, the motor may be caused to shift the contactor 24 along the slide-wire 22 in a direction and to an extent to restore electrical balance originally disturbed by displacement of the contactor 23 with respect to the slide-wire 21. Since the object 57 to be positioned is arranged to move in correspondence with the contactor 24, it is therefore possible to control the position of this object by manually setting the contactor 23 to any selected position as determined by its observed relation to the graduated scale 56. While, in the interest of simplicity and clarity, the servomotor system has been shown as subject to the control of a balanceable network comprising resistance elements only, it will be obvious to those familiar with the art that equivalent results may be obtained by suitable combinations of corresponding elements characterized by having their impedance in the form of inductance or capacitance.

It is well known that in servomotor systems of high sensitivity there is a tendency of the motor, due to inertia of the moving parts, to coast after the power is discontinued, and that, unless the balance condition is in some manner anticipated, the balancing device— in this case, the slide-wire contactor 24—will tend to overshoot the balance point, thus establishing a condition of instability and tending to set up oscillations in the performance. If, as previously pointed out, operating conditions could be rendered free from uncontrolled variables, such as mechanical friction, load to be moved, applied voltage, etc., a degree of stability could be obtained by so adjusting the sensitivity of the system that the motor is de-energized at a predetermined point prior to the attainment of balance, whereupon the characteristic inertia of the mechanism would be just sufficient to carry it to the position of balance. Since ideal conditions are seldom, if ever, obtained in practice, it follows that such damping methods must be replaced, or supplemented, by stabilizing means adapted to recognize the motor speed and transient characteristics.

It has been found that satisfactory stabilization of apparatus of the class under consideration may be approached by combining with a balance anticipator of the type which de-energizes the motor prior to attainment of the balance condition such relay means as will resensitize the motor as it approaches a condition of rest, and will continue to do so repeatedly until a true balance is attained. In order for such a system or method to be truly satisfactory and provide a balanced condition with a minimum number of increments of motion, it becomes desirable that such stabilizing means have an inherent time characteristic superimposed thereon, so that the width of the neutral zone characterizing motor operation will be varied according to conditions encountered in the system. Means for thus incorporating a dual timing characteristic on the ultimate balance will now be described.

A limited, and transient, increase in the effective width of the neutral zone associated with the control point at which the balancing motor operates is effective by connecting a high resistance unit 85 in series with a capacitor 86 and the contacts of a normally open relay 87. The actuating winding of said relay is connected to the circuit in such a manner that it will tend to be energized when the motor 25 is in operation and de-energized when said motor is at rest. While a variety of connections to accomplish this action will be apparent to those versed in the art, it has been found expedient to energize the relay in the manner shown, by connecting its terminals across the armature of the motor 25.

A variable time characteristic involving a further and progressively decreasing broadening of the neutral zone, is introduced by means of a shunt circuit comprising the combination of a resistor 88 of the order of 1 megohm connected in parallel with a suitable capacitor 89 and bridged across the conductors 73 and 62 in series with a grid return resistor 90, which has with respect to the resistor 88 a value sufficiently low that, in so far as bias effects are concerned, the grid circuit of the triode 74 may be considered as virtually in parallel with said capacitor and the resistor 88. In order that the performance of the triodes 74 and 69 may be cumulative in effecting results hereinafter to be pointed out, the control grid of the tube 74 also is connected through a grid return resistor 91 having a value of the order of one megohm to the junction point of the resistors 88 and 90 and the capacitor 89. As the signal voltage applied to the grid of either triode becomes positive with respect to the cathode, the shunt circuit provides a path whereby an electron flow may take place from the cathode to the grid within the tube, and through the respective grid return resistors in series with the resistor 88 outside the tube back to the respective cathodes. The resistor 88 being of predominantly high value, the capacitor 89 in parallel therewith will tend to attain a negative potential approaching the voltage drop caused by the grid current. As the signal voltage falls to a value where the corresponding grid remains negative with respect to the cathode, the capacitor can discharge only through the high resistance of the unit 88. Thus, the capacitor 89 is charged rapidly through one circuit and discharged slowly through another; and, furthermore, the effect of the potential attained by said capacitor will be to bias the grid negatively with respect to the cathode. Therefore, as the capacitor 89 is charged, the sensitivity of the system is inherently reduced by the fact that a larger signal, representing a greater bridge unbalance, is required in order to keep the motor running. By suitable selection or adjustment of relative values of the resistor 88 and the capacitor 89, the time constant of the grid biasing circuit may be varied through a considerable range; and, according to desired performance conditions, the bias may be caused to decrease at a rate faster, or slower, than, or substantially equal to, the rate of decrease of the signal potential as the bridge network approaches a condition of balance.

To recapitulate the foregoing statements with respect to the triode 69, which is directly responsible for the control of the balancing motor 25; this tube has associated with it two desensitizing circuits, one responsive to the grid signal potential and tending to reduce the same while the motor is in operation, and one responsive to the grid current and tending to superimpose a negative bias on the grid signal potential while the unbalance condition is of relatively great magnitude. The same fact may be alternatively expressed by the statement that under normal operating conditions so long as a considerable departure from a balance condition exists the system is subjected to a twofold influence tending to decrease the sensitivity. One of these influences is due to inverse feedback through the circuit completed by the contacts of relay 87, which influence tends to establish about the balance point a dead-band through which the inertia of the motor and associated mechanism may cause the latter to "coast" to a position of balance. The other de-sensitizing influence is that due to the grid bias on the triode 69 as previously set forth.

The de-sensitizing circuit including the capacitor 89, being in parallel with the grid-cathode path within the triode 69, will be subjected to the same potential as the grid, so that its biasing effect will not only be subject to the magnitude of that potential but will experience a progressive reduction as the capacitor charge leaks off through the resistor 88 whenever the grid potential falls below a critical value. Thus, with decrease of the grid potential as the relay 87 is energized, the biasing effect will be correspondingly reduced, but the falling off in value will be progressive, and exponential in nature.

While, as hereinbefore pointed out, elimination of over-shooting may in theory be obtained by establishing the width of the dead-band so that the motor will "coast" to the position of balance, the influence of uncontrollable variables in such as to render such an expedient not universally practicable; and it is with a view to compensating for these variables that the timed desensitizing circuit has been combined with that subject to control of the relay 87. The width of the neutral zone introduced by the relay can be adjusted by suitable selection of circuit components, and in general is made such that the motor will come to rest before the balance point is attained. By varying the values of resistor 88 and capacitor 89, moreover, the initial charge on the latter can be controlled. Under a relatively narrow band of conditions these values may be made such that the motor may be given critical damping, or overdamped, or underdamped at will. When the width of the dead-band is made such that the motor comes to rest short of the balance point or beyond the balance point, the concomitant opening of the contacts of the relay 87 will momentarily eliminate the neutral zone, re-energizing the motor to correct the small incremental error. Under this condition the motor will thus tend to approach the balance point by a series of successive short impulses. Since, however, the motor, though fully energized, does not have time to reach full speed in such a small travel, the probability of overshooting the balance point can be reduced virtually to zero. The action of the auxiliary de-sensitizing circuit including the capacitor 89 is to superimpose an influence adding a time increment to the fixed band-width established by the relay. If the motor, approaching the balance point, passes the edge of the dead zone before the variable band-width effect of the capacitor circuit leaks off, it will drop out sooner than if it were approaching at a lower speed. There is thus developed a "race" between the motor and the variable dead-band, both approaching a balance point, and tending toward the attainment of a condition of equilibrium in a minimum of time.

Figure 2:
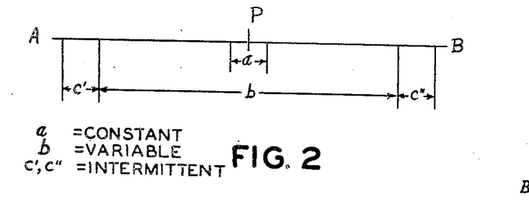
Fig. 2 is a graphic presentation of the performance of inter-acting elements of the invention.

The performance of the several components of the control circuit having been explained in detail, their coaction may be visualized by reference to the graphic presentation in Fig. 2. Designating by the line AB a portion of the range of travel of the object to be moved, the point P may be taken as representing the true balance point, or the position at which said object is desired to come to rest for a given setting of the transmitting contactor. Because of lack of sensitivity inherent in relays or other elements of the system, or artificially introduced to preclude mechanical oscillation or hunting, there will exist a zone of inactivity, designated by *a*, within which the controlled mechanism may come to rest at any point, and within which a corresponding displacement of the transmitter will produce no response in the balancing motor. As an approximate figure, the zone $a$ may be taken as representing from ½% to 1% of the range of operation. As previously pointed out, if all variables, such as load, velocity, friction, inertia, voltage, etc., could be maintained constant, such adjustment might be made as to cause the motor to "coast" to the desired balance point. But, such not being the case, resort is had to the superposition on the basic neutral zone of such supplementary de-sensitizing influences as will tend to compensate for uncontrollable variables and effect critical performance of the system under a variety of operating conditions.

Figure 3:
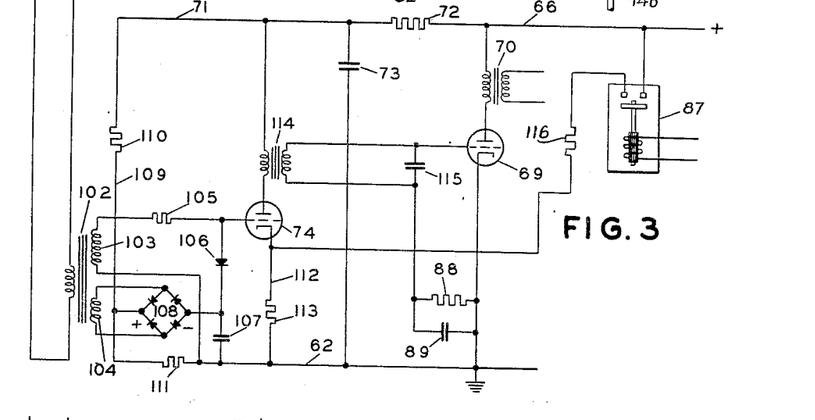
Fig. 3 is a diagram of a form of the invention alternative to that shown in Fig. 1.

The broadening of the neutral zone due to biasing of the grid of the tube 69 as the capacitor 89 becomes charged may be represented by the zone $b$, which, according to operating conditions, may attain a magnitude of from 60% to 70% of the operating range; and this will be progressively reduced with respect to time as the charge of said capacitor is gradually depleted. The supplementary neutral zone introduced by the relay 87 as the motor operates may be represented by the increments $c'$ and $c''$, these being of substantially constant magnitude, and, as the relay 87 becomes de-energized with stoppage of the motor, being automatically eliminated from the system, with a concomitant increase in sensitivity. The value of these increments may vary according to the design of the instrument. For example, they may be five times the magnitude of $a$, or less. The relay 87 contributes materially to the stability of the system; and while, in special cases where high-speed response and great sensitivity are not required, this relay might be omitted, its presence is especially important where the attainment of stable operation in conjunction with rapid response and high sensitivity are desired. An alternative arrangement of the relay 87 is shown in Fig. 3, and will hereinafter be more fully described and explained.

In the practical operation of positioning systems of the class to which the present invention is directed, especially in aircraft installations, it is of paramount importance that accidental failure of any component of the system be not effective to introduce uncontrollable and hazardous conditions. While the element of hazard cannot be wholly eliminated, it is found that in general the least dangerous condition in event of loss of control is that wherein the positioned object remains in the position it occupied at the instant the trouble occurred. In a system involving electronic detecting and amplifying elements, such as are herein described, it will be obvious that failure of any electronic tube or its associated components in the detector circuit will almost universally result in loss of output signal, representing a "safe" condition; but where electronic tubes are used as phase-discriminating amplifiers and their output currents utilized in the operation of relays or motors, a fault in a tube, or progressive deterioration due to aging, may be reflected in a phase shift, resulting in malfunctioning of the apparatus and the development of hazardous conditions. In this respect, electro-mechanical phase-selective relays have been found to be more dependable than electronic tubes, the use of which, therefore, in the present invention, is restricted to those parts of the amplifying system wherein their failure, as above-stated, is unlikely to introduce false operation of the controlled instrumentalities. Moreover, in a balanced network, as exemplified in its simplest form in a Wheatstone bridge, failure of any component of the network will be reflected in an abnormal unbalance, which according to the nature of the failure, whether it be an open circuit or a short circuit, and to the location of the failure in the network, may result in an error signal which will cause the positioned member to be displaced to one or the other extreme of its possible excursion, with no possibility of return until the fault is located and corrected.

In the electrical network as hereinbefore described, it will be noted that the slide-wires 21 and 22 comprise each but a small proportion of the total resistance of the branch of the circuit in which it forms a part. Thus, the voltage drop across each slide-wire is a correspondingly small proportion of the potential between the conductors 42 and 45. (With the fixed series resistors having each a value of the order of twelve times that of the associated slide-wire, as hereinabove set forth, the drop across each slide-wire would be of the order of 4 percent of the bus voltage.) If the working range of the detector circuit including the electron tube components is made to correspond to the potential range across the slide-wires, it will be apparent that any defect in the bridge network, as represented by a short circuit or an open circuit, will almost infallibly result in there being impressed upon the detector section a potential far in excess of normal operating values.

Upon the occurrence of a signal of abnormal amplitude, as would result from failure of some element of the bridge network, the grid of triode 74 will tend to conduct current, thus building up a relatively great negative bias across the capacitor 79. This not only reduces the tube 74 to a condition of low plate signal output, but, by virtue of the coupling provided through resistor 91, the potential effect is communicated to the grid of tube 69, tending to bias the latter to a condition where the residual signal (from the plate of tube 74) is insufficient to overcome the said bias, and the triode 69 thus rendered substantially non-conductive. Thus, the control system is made inactive, and the motor 25 is de-energized and caused to remain at rest so long as the faulty condition continues to exist.

In Fig. 3 is diagrammatically represented a portion of a control network embodying the principles of the invention, but incorporating the de-sensitizing characteristics in a manner alternative to that shown in Fig. 1. The distinction between the alternative arrangement and that hereinbefore set forth lies wholly in that portion immediately associated with the first stage of amplification; and it will be understood that, not only the bridge network as shown, but the second stage of amplification, the relays, the motor system, and all associated circuit components may be identical with those set forth and explained in connection with the embodiment shown in Fig. 1.

The movable contacts 23 and 24 of the bridge network are connected directly to the primary terminals of a coupling transformer 102 having two secondary windings 103 and 104, the turn ratio between the former and the latter being of the order of 19/1. One terminal of the secondary 103 is connected to the ground conductor 62, and the other to the control grid of the triode 74 in series with a resistor 105 having a value of the order of 200,000 ohms. In parallel with the grid circuit of said triode is a diode rectifier 106 having its anode connected to the grid of the triode, and its cathode in series with a capacitor 107 to the conductor 62, thus completing the circuit of the secondary winding 103. The terminals of the secondary winding 104 are connected across a rectifier 108, preferably of the full-wave type. The negative terminal of said rectifier is connected between the diode 106 and the capacitor 107. The positive terminal of said rectifier is connected to a conductor 109 forming an intermediate tap on a voltage divider comprising two resistance units 110 and 111 connected in series between the conductors 71 and 62. The cathode of triode 74 is connected to a conductor 112, and thence in series with a suitable biasing resistor 113 to the ground conductor 62. The relative values of the resistance units 110 and 111 are so selected that with normal operating potential between the conductors 71 and 62 and no signal voltage applied to the transformer 102 the potential of the conductor 109, and hence that of the junction point between the diode rectifier 106 and the capacitor 107 will be such as to bias the former to a condition of negligible conductance. The output circuit of the tube 74 is coupled to the input of the tube 69 through a transformer 114, which in the circuit substantially replaces the resistor 90 of Fig. 1, one side of the secondary of said transformer being connected to the control grid of said last-named triode and the other side to the common point of the resistor 88 and the capacitor 89. A high-impedance capacitor 115 may be connected across the terminals of the transformer 114, whereby to compensate for phase-shift in its output and maintain correct phase-relationship between said potential and the excitation of the synchronous contactor 33. The pulsing action of the relay 87, fully described in the explanation of Fig. 1, may be utilized in a slightly different manner in the embodiment of Fig. 3. Said relay 87 is shown with one of its contacts connected to the positive conductor 66 and the other, in series with a suitable resistor 116, to the cathode lead 112 of the triode 74. The performance of this relay as here shown will presently be set forth.

Under normal operating conditions, with the bridge circuit delivering an unbalance signal no greater than that derived from displacement of the movable contactors 23 and 24 with respect to each other, the circuit branch including the diode rectifier 106 will provide no significant shunting of the grid of the triode 74, and substantially the whole of such voltage as might appear between the terminals of the secondary winding 103 would be available as a controlling signal. Under normal operating conditions, the signal derived from the bridge network is of sufficiently low magnitude that the potential from the secondary winding 104, rectified in the bridge rectifier 108 and superimposed upon that derived from the voltage divider, is not enough to have a significant effect upon the latter potential, and the tube 74 receiving substantially the full signal developed in the secondary 103 continues to operate at its maximum sensitivity. As the voltage applied to the primary winding of the transformer 102 is increased, the potential developed in the secondary 104 will become of significant magnitude; and this potential, rectified and superimposed upon that existing across the capacitor 107, will alter the bias upon the rectifier 106 until the latter tends to become conductive, providing a shunt across the grid circuit of the triode 74. The alternating current impedance of the capacitor 107 being low in comparison with that of the resistor 105, the major part of the potential developed in the secondary 103 will be absorbed in the latter, with a consequent significant reduction of signal available for operation of said triode. In short, as the signal impressed upon the primary of the transformer 102 reaches a predetermined critical magnitude, the sensitivity of the amplifier responsive to its secondary potential is materially reduced, with a concomitant loss of gain between the bridge signal and the output of the tube 74. Thus, while normal operating signals from the bridge network will be amplified to an extent sufficient to actuate the triode 69 for normal operation of the balancing motor, signals of abnormal magnitude, such as the potentials developed as a result of defects in the measuring circuit, will tend so to reduce the sensitivity as to render the system inoperative. It may here be observed that, while superposition of a supplementary potential upon the normal bias of the diode 106 could be effected by means of a half-wave rectifier in the circuit of the secondary winding 104, the result is accomplished more effectively by means of the full-wave rectifier 108 shown in Fig. 3. Not only does the full-wave rectifier develop an output having a smaller alternating component, but the double frequency of this component, as compared with the fundamental frequency of the component from a half-wave rectifier, materially simplifies the problem of filtering, and also eliminates the possibility of spurious A.-C. effects in the synchronous contactor and in the polarized relay.

Improvement in operation of the system involving the shunting of the grid of the tube 74 by the rectifier 106 under conditions of an abnormal voltage in the transformer 102 has been found to result from a modification in interconnection between the two stages of amplification, as indicated in Fig. 4. This arrangement is identical with that of Fig. 3 with exception of the fact that one end of the resistor 88 in the second stage of amplification is disconnected from the ground conductor 62 and transferred by means of a conductor 117 to the grid lead of tube 74 between the resistor 105 and the negative terminal of the diode rectifier 106. The action obtained with this modified connection may be explained as follows: While under conditions of abnormal signal value the rectifier 106 shunts the grid of the tube 74, the shunting action is of necessity incomplete, and a residual signal may be impressed upon the tube 74 and thereby through the transformer 114, upon the triode 69. The latter tube, receiving only a small signal, will not normally have the tendency to bias itself off, as hereinbefore explained, under application of relatively great signal voltage, and may develop sufficient output to produce objectionable results. The modified connection provides means whereby, under the influence of an abnormal signal in the first stage of amplification, the tube 69 will be biased off in the desired manner. It will be observed that, while with an excessive signal the diode 106 provides a shunt for the positive half of the alternating component of the signal impressed upon the control grid of the tube 74, the negative half is not so shunted, and the grid tends to attain a relatively high negative potential. With the conductor 117 connecting said grid to the input side of the second stage of amplification, the resistor 88, the secondary winding of the transformer 114, and the grid of the triode 69, are similarly biased, thus effectually cutting off the triode and preventing response to such signal as may at the time be derived from the output circuit of the first stage of amplification.

A similar interaction of the two stages of amplification has been discussed in explaining the form of the invention shown in Fig. 1; and, in view of the conventional usage of the term "feedback" to designate a system wherein a portion of the output of an amplifying system is returned to the input to produce a modifying effect upon the signal, the herein described connections, whereby the grid potential of a tube in an early stage of amplification is superimposed upon the control electrode of a tube in a higher stage, may aptly be described as a "feed-forward" element of the system.

It may here be pointed out that the "feed-forward" feature does not significantly modify the normal performance of either stage of the amplifying system. Under ordinary conditions, the diode 106 being substantially non-conductive, and the ground connection of the resistor 88 being completed through the conductor 117, the resistor 105 and the winding 103 in series, the only effect upon the direct-current flow tending to establish the normal bias of the grid in the tube 69 is that due to the increased resistance of the alternative circuit. As the resistor 88 is normally of high magnitude and not at all critical in its value, this effect is of no material consequence, and, as far as may seem desirable, may be compensated for by suitably selecting the associated components of the circuit. Also, as the capacitor 89 provides a low impedance shunt for alternating current in parallel with the branch which includes the resistors 88 and 105, the grid potential of the tube 69 will not be appreciably back-fed to the input circuit of the tube 74. Similarly, the capacitor 89, providing a low impedance shunt in parallel with the secondary winding of the transformer 114, will prevent appreciable superposition of the A.-C. signal of the first stage of amplification upon the control circuit of the second stage. In general, it may be said that, with the arrangement shown, superposition of the first stage input signal upon the second stage of amplification, while providing the safety features set forth, is virtually non-interfering with normal performance of the amplifiers under ordinary operating conditions.

Figure 5:
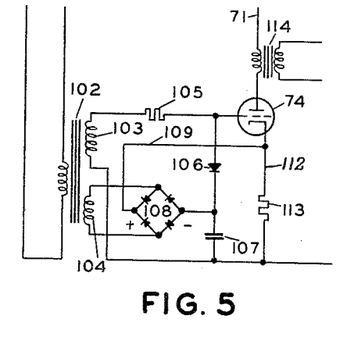

While the diode 106 has been set forth as having its bias potential established by a voltage divider comprising the resistors 110 and 111, it is possible in some instances so to select the characteristics of circuit components as to render the desired potential inherently available at another point in the network. For example, referring to Fig. 5, the value of the resistor 113 may be so chosen with respect to the characteristics of the triode 74 that the quiescent current flowing therethrough under a condition of balance in the network will cause the intermediate conductor 112 to assume a potential substantially equivalent to that normally derived from said voltage divider. In such cases the positive terminal of the rectifier 108 may be transferred from the conductor 109 to the conductor 112, as by the connection 109', whereupon the circuit may be simplified, and the drain upon the power supply reduced, by elimination of the resistors 110 and 111.

Reference has been made to an arrangement of the pulsing relay 87 alternative to that shown in Fig. 1, and as illustrated in Fig. 3. The performance of this alternative arrangement will now be explained. It will be understood that the winding of the relay 87 is connected either in the motor circuit as indicated in Fig. 1 or in some other conventional manner whereby said relay will be energized and de-energized coincidentally with the operation of the motor 25. It will be noted that when the contacts of the said relay are closed, the conductor 112 is connected to the conductor 66 in series with the resistor 116, whereby, the combination of said resistor with the resistor 113 in series functioning as a voltage divider, the bias of the cathode of the triode 74 is raised, correspondingly decreasing its sensitivity. As the motor 25 approaches the neutral zone so established, the signal potential from the bridge network will become too weak to overcome this bias, whereupon the motor 25 and the relay 87 will be de-energized, the latter opening its contacts and causing the cathode bias of the tube 74 to revert to normal, with a concomitant increase in sensitivity and consequent re-energization of the motor. Thus, as hereinbefore set forth, the motor will tend to restore circuit balance by a series of successive impulses.

A further characteristic of the arrangement of the relay 87 as shown in Fig. 3 is found in an inherent, and desirable, tendency toward a variation in the rate of the pulsing action, as reflected in a progressive increase in durations of the intervals between pulses as the balance point is approached. As the contacts of the relay 87 are opened and closed, the bias on the triode 74 will undergo abrupt changes, which transients will be amplified by the triode and impressed upon the primary winding of the transformer 114. The resulting surges in the secondary potential of said transformer will be introduced into the grid circuit of the triode 69, and, because of the rectifying characteristic of that circuit, will tend to increase the grid bias of that tube, cutting off the error signal response from the power relay 28 and de energizing the motor 25. As the motor comes to rest, the relay 87, as hereinbefore explained, will open its contacts and establish another cycle or pulse of operation. Since the result of the motor operation is to reduce the magnitude of the signal potential, and since the transient introduced into the system by abrupt operation of the relay contacts is of substantially constant value, it follows that the effect of the latter will be progressively more pronounced as balance is approached, with the bias disturbance on the triode 69 progressively increasing with each pulse. As the temporary bias of the tube 69 is reduced only as the capacitor 89 is discharged through the resistor 88, it follows that the greater the charge so to be dissipated, the longer will be the time required for the bias to fall to a value where the error signal may become effective. Thus, as balance is approached, the impulses introduced by repeated operation of the relay 87 are separated by time intervals of progressively increasing duration, which action is recognized in the art as a criterion of stability and a characteristic of optimum performance in servomotors.

While the control circuit has been shown as embodying a three-position neutral-seeking two-coil relay energized by the output of the amplifier system rectified through a single-pole double-throw synchronous contactor, equivalent results may be obtained with a simpler form of relay, having but one winding, when energized through a double-pole synchronous contactor. A form of contactor especially suited to this purpose is fully set forth in co-pending U. S. patent application Serial No. 103,869, filed July 9, 1949 by J. L. Russell, and also in application Serial No. 120,893, filed October 12, 1949 by F. L. Maltby. Such a relay-contactor combination is shown in Fig. 6 of the drawings. The relay, designated by the numeral 119, is structurally identical with the relay 28 shown in Fig. 1, the sole distinction lying in the fact that the double winding of the latter, comprising the two coils 29 and 30 is replaced by a single winding 120, so disposed that the associated contact-carrying polarized armature will be deflected, in a sense corresponding to the direction of the unidirectional component of current in the winding, and will seek a neutral position when said winding is de-energized. The winding 120 is the full equivalent of the coils 29 and 30, connected as shown in Fig. 1, but with the tap at their common point eliminated from the circuit.

The construction of the synchronous contactor 121 is as follows: A permanent magnet member or equivalent 122 is fitted with pole pieces to provide two air gaps in which are located the extremities of a ferromagnetic armature 123 adapted to excitation by a winding 124. The armature 123 is provided at one of its extremities with a movable contact 125 adapted alternatively to engage two stationary contacts 126 and 127, and at the other of its extremities with a movable contact 128 adapted alternatively to engage two stationary contacts 129 and 130. The disposition of the magnetic structure, and the relative proportioning and positioning of the other elements of the contactor are made such that upon energization of the winding 124 from an alternating-current source, the magnetic fluxes so established, reacting with that from the permanent magnet 122, will cause the contacts 125 and 128 to partake of an oscillatory motion synchronous with the current flowing in said winding, and having such mutual relationship that during one half-wave of said current the contacts 125 and 126 will be in engagement, and at the same time the contacts 128 and 130 will be in engagement, and during the other half-wave of said current the contact 125 will engage the contact 127 while the contact 128 will engage the contact 129. Thus, upon energization of the winding 124, the contacting device tends to function as a double-pole double-throw switch operating in synchronism with the current in the winding. Contacts 127 and 130 are both connected to one terminal, and contacts 126 and 128 to the other terminal of the winding 120; and contacts 125 and 128 are connected to the respective secondary terminals of the transformer 70. Thus, the contactor when energized by alternating current in the winding 124 will function as a synchronous reversing switch or commutator; and, with the exciting current in said winding bearing a proper phase relationship to the output potential of said transformer, said potential will be rectified and caused to actuate the polarized relay in a direction depending upon the sense of unbalance of the bridge network, whereby to initiate in the motor 25 a balancing action as hereinbefore set forth. A capacitor 131 and a resistor 132, connected in parallel across the terminals of winding 120, performing functions similar to the corresponding capacitor and resistor 81 and 82, will, in general, improve the performance of the contactor-relay combination.

Figure 7:
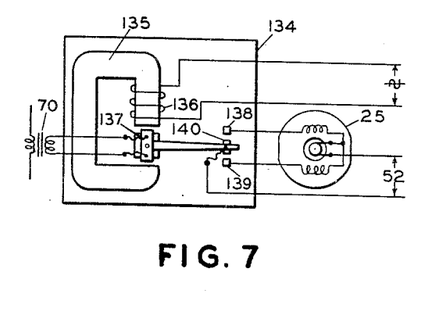

As an alternative to the combination of a synchronous contactor and a polarized relay, there is shown in Fig. 7 a phase-selective alternating-current relay 134 adapted to control of the balancing motor in response to the output signal of the amplifying system. The relay 134 is provided with a magnetizable structure 135 adapted to excitation by a suitable winding 136, and having an air-gap with a coil 137 movably positioned therein normally seeking a neutral position and adapted to be deflected in a sense depending upon the phase relation between current flowing in said coil and the field of said magnetizable structure. Such relays are well known in the art; and for specific examples reference may be had to U. S. Letters Patent No. 1,971,764, granted to P. A. Borden et al., August 28, 1934. The relay is provided with two stationary contacts 138 and 139 respectively, and with a contact 140 carried by the movable coil 137 and adapted to be brought into electrical engagement alternatively with the contacts 138 and 139, according to the sense of deflection of said movable coil. The coil 137 is connected to the secondary terminals of the transformer 70.

The exciting winding 136 may be connected to the source of alternating-current supply for the measuring network, or, like the contactor winding 38 in Fig. 1, may be placed in series with the bridge circuit, or may otherwise be energized, according to means well known in the art, so as to produce in the air-gap an alternating field adapted to optimum response of the moving coil 137. The stationary contacts of the relay 134 are connected to the respective field windings of the motor 25, and the movable contact 140 and the free terminal of the motor are connected to the power source 52, whereby the motor will be energized for operation in a direction depending upon the sense of deflection of the moving coil of the relay. Under operating conditions, the relay 134, being continuously excited to produce an alternating field in its air gap, will function in the manner of a wattmeter, and the movable coil 137 will be subject to deflection in a sense depending upon the phase relation between said field and a signal from the transformer 70, whereby the contact 140 will engage either the contact 138 or 139, and energize the motor 25 for rotation in a corresponding direction. Thus, the motor is rendered directionally responsive to the output of the transformer 70 in a manner similar to that set forth in explanation of the previously disclosed arrangements.

Figure 8:
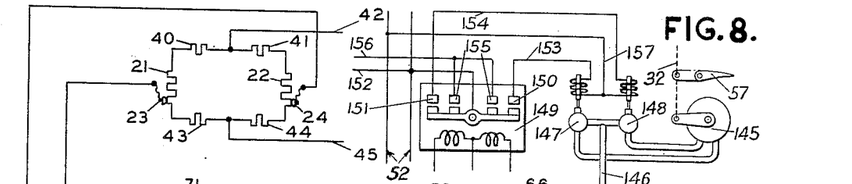
Fig. 8 shows diagrammatically the manner in which the invention may be adapted to control of a fluid-operated motor.

Fig. 8 illustrates adaptation of the principle of the invention to the actuation of a fluid-operated motor 145, which may be of either the hydraulic or pneumatic type, and which is here shown with its movable part connected to the mechanical linkage 32 of Fig. 1, whereby to actuate the controllable member 57, and incidentally the balance-restoring member 22 as shown in Fig. 1. The motor 145 receives operating fluid from a pressure source 146 through either of two mutually independent electrically actuated valves 147 and 148, whereby to be operated in either direction according to which of said valves has its actuating winding electrically energized. A polarized relay 149, which in its arrangement and method of energization may correspond to any one of the three hereinbefore described relays 28, 119, or 134, is provided with contact means 150 and 151 whereby to connect a common conductor 152 alternatively to either of two conductors 153 and 154 according to the sense of energization of said relay, and also with an auxiliary pair of stationary contacts 155, permanently connected to a conductor 156 and adapted to be connected to the common conductor 152 upon energization of the relay 149 in either sense. The actuating windings of the valves 147 and 148 have each a terminal connected to a common conductor 157 and their free terminals connected to the conductors 153 and 154 respectively. The conductors 152 and 157 are connected to the two sides of the power supply 52 of Fig. 1, and actuating winding of the relay 87, shown in Figs. 1 and 3, is connected to the conductors 152 and 156.

Operation of the apparatus shown in Fig. 8 is essentially similar to that shown in the other embodiments of the invention; and there will be no need here again to outline the performance of the circuits between the primary control device and the polarized relay. Through the contact 150 or 151 of said relay, according to the sense of its deflection, the valve 147 or 148 will be actuated, causing the fluid motor 145 to be operated in a corresponding direction. Through the linkage 32, the controlled member will be positioned, and, as hereinbefore set forth, a condition of electrical balance tend to be re-established in the control circuit.

In the foregoing embodiments of the invention, the pulsing relay 87 has been shown as directly connected to the motor circuits to be energized concurrently therewith. In the form shown in Fig. 8, as the motor has no electrical circuit, this relay must receive its actuating current through other means. Such means is provided by the auxiliary contacts 155 in the relay 149, one or other of these being connected to the common conductor 152 without respect to polarity, whenever the relay 149 is energized. This connection provides actuating current for the relay 87, whose performance will thus be substantially identical with that set forth for its energization by direct connection to the circuit of an electric motor. Incidentally, it may be said that in certain cases where an electric motor is used, either with or without power relays, it has been found expedient and advantageous to provide energization for the pulsing relay from auxiliary relay contacts in a manner corresponding to that shown in Fig. 8, rather than by direct connection to the motor circuit.

In certain forms of the invention, the desirable pulsing action obtained by the use of relay 87 may be simulated by modification of the circuit elements directly associated with the polarized relay, and the mechanical features of the pulsing relay consequently eliminated. This is accomplished in the manner shown in Fig. 9, which will be recognized as based essentially on the amplifier arrangement appearing in Fig. 3 in combination with the synchronous contactor 33 and polarized three-position relay 28 of Fig. 1. (The several elements shown in Fig. 9 and not otherwise explained may be assumed as identical in form and function with the similarly designated elements in Figs. 1 and 3.) Because the form of the invention now under discussion requires that the current controlled by the relay 28 be unidirectional in its nature, and preferably derived from the source represented by the conductors 66 and 62, it becomes expedient that the contacts of said relay be connected to the actuating windings of two mutually identical "power" relays 160 and 161 respectively, the contacts of said last named relays being utilized for the energization of a balancing motor in a selected one of the many methods known to the art. A terminal of each of the relays 160 and 161 is connected to the positive conductor 66, and the common contact member of the relay 28 is connected to the negative conductor 62. Thus, according to the sense of deflection of the relay 28 from its neutral position, one or other of the relays 160—161 will be energized with direct current from said conductors 66—62, while with the relay 28 in its normal neutral position both of said power relays will stand in a de-energized condition.

Between the contacts of relay 28 is connected a midtapped resistor 162 having a value many times that of either of the power relay windings. For example, with coils in the relays 160 and 161 each having a resistance value of the order of 5,000 ohms, each section of the resistor 162 may be of the order of 3 megohms. With conventional types of relays, such relative proportioning renders it impossible that either of the power relays can be operated by current which under any operating condition might flow through the resistor 162. The mid-point of the resistor 162 is connected, in series with a capacitor 163, to the common point of resistor 88, capacitor 89 and transformer secondary 114 (which point may here be designated as conductor 164).

In considering the operation of the form of the invention shown in Fig. 9, it will be seen that when the polarized three-position relay 28 is in its neutral position, with both contacts open, these contacts, as well as the windings of relays 160 and 161, the whole of resistor 162, and one side of the capacitor 163, will assume the potential of positive conductor 66. Upon the relay 28 closing either of its contacts, that contact will immediately assume the potential of the negative conductor 62; and the resistor 162 in series with the winding of the inactive power relay, acting as a voltage divider, will reduce the potential of the capacitor terminal to which it is connected to a value substantially half that to which it was formerly subjected. The capacitor 163 will consequently tend to discharge to the lower potential; and in so doing it will transfer a part of its charge to the capacitor 89, creating a negative charge increment (i. e., a bias increment) on the conductor 164.

This bias increment may be made sufficient to desensitize the amplifier to the point of de-energizing relay 28, which will revert to its neutral position, re-establishing the corresponding potential relationships, and, so long as the signal is not increased, initiating an action whereby a balance condition is approached by a succession of impulses separated by time intervals of progressively increasing duration. Since the action of triode 69 is dependent upon the relative strength of the signal and the grid bias, it will be obvious that these can be so proportioned that at a selected signal strength the bias introduced by action of the relay 28 will be ineffective to modify the performance. Thus, it will be seen that, by modifying the bias on the triode 69 by the method and means shown in Fig. 9, the action heretofore set forth as characterizing the performance of the relay 87 in Figs. 1 and 3 may be substantially duplicated.

In certain instances it has been found that performance of the balancing system will be improved by conferring a unilateral or asymmetrical characteristic on the charging and discharging of the capacitor 163 and thereby minimizing the number of impulses necessary to attainment of a balance condition, after the control system enters the neutral zone. This may be effected (as shown dotted in Fig. 9) by inserting in the circuit between the capacitor 163 and the conductor 164 a diode rectifier 165 with its cathode connected to said capacitor and its anode to said conductor, and providing a high-value resistor 166 between said anode connection and the conductor 62. With this arrangement, while the diode 165 does not appreciably affect the discharge of the capacitor 163 upon closing of either contact of the relay 28, it prevents correspondingly rapid re-charge of that capacitor when the contact is opened. The capacitor 163 can regain its charge only through the high-value resistor 166; and, so long as the incoming signal remains unchanged in its value, each succeeding pulse of the relay 28 will be correspondingly delayed. Incidentally, by preventing discharge of the capacitor 89 through the resistor 166, the diode 165 tends to maintain the negative bias on the control grid of the triode 69.

Figure 10:
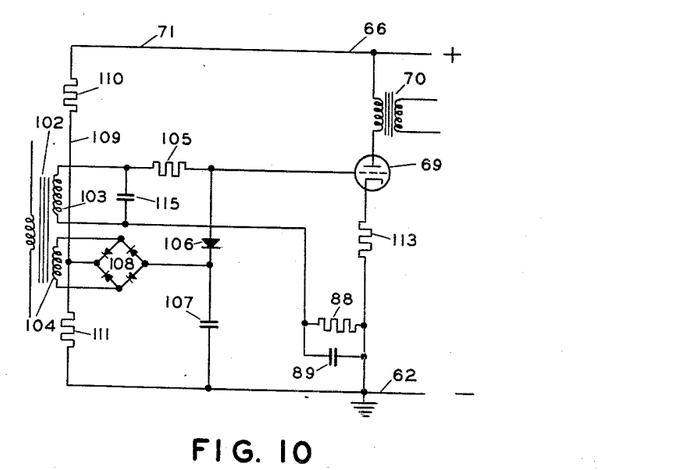

While the control circuit of the invention has been set forth in forms involving two stages of amplification, as represented in the triodes 74 and 69 respectively, it will be appreciated that the principles are in general equally applicable to a system involving only a single stage, as shown in Fig. 10, which is based on the form illustrated in Fig. 3, but with one of the two stages of amplification eliminated. The triode 69 is arranged with its anode circuit connected (as in Fig. 3) to the positive conductor 66 in series with the primary winding of the output transformer 70. The cathode of the tube 69 is connected to the negative conductor 62, but with the biasing resistor 113 transferred from the eliminated stage and placed in series with said connection. The control electrode of the tube 69, instead of being energized as heretofore from a first stage of amplification, is connected, in series with the resistor 105 whose function has been fully explained, to one terminal of the secondary winding 103 of the coupling transformer 102. The free terminal of the winding 103 is connected to the negative conductor 62 in series with the parallel-connected combination of resistor 88 and capacitor 89, whereby a time characteristic is introduced into the response of the amplifying system. The phase-compensating capacitor 115, connected across the input to the amplifying system, may if desired be retained in the arrangement.

The control electrode of the triode 69 is shunted to the negative (ground) conductor 62 by the rectifying diode 106 in series with the capacitor 107, as shown; and between these units is connected the negative terminal of the rectifier 108, whose positive terminal is connected to the voltage divider comprising resistors 110 and 111 in series between the conductors 66 and 62. (Alternatively, the positive terminal of the rectifier 108 may be connected to the cathode of the triode, as in the form of the invention shown in Fig. 5.) The rectifier 108 is energized from the secondary winding 104 of the transformer 102.

Consideration of the form of the invention shown in Fig. 10 will make it apparent that the performance of the control system there illustrated will be essentially similar to that hereinbefore described, and that the responses of the amplifying apparatus with respect both to stabilization of control and to signals of abnormal amplitude will be mutually compatible, differing significantly from those characterizing the previously described forms only in the lesser degree of gain inseparable from a reduction in the number of stages of amplification. It will further be apparent that further stages of amplification may be added to the system according to methods well known in the electronic art, and without in any way departing from the spirit of the invention.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In an electric control system for positioning a motor and of the class comprising an electrical network adapted to establish a control signal upon unbalance and having a portion which may be varied by said motor to re-establish a condition of balance, detector-relay means responsive to said signal and adapted to influence the operation of said motor in correspondence thereto, said detector-relay means comprising an electron tube having an anode, a cathode and a control electrode, means for impressing a potential representing said signal between said control electrode and said cathode, whereby upon energization of said network from a fluctuating-current source a potential representing unbalance will cause a corresponding current to flow in the anode of said tube, means dependent upon the amplitude of said signal potential for biasing said control electrode toward a condition of cutoff, whereby the equivalent amplification of said electron tube will vary in a sense opposite to variations in the intensity of said signal potential, a normally incomplete circuit providing feed-back path between the control electrode and the anode of said tube to increase its threshold of operation, means operable concurrently with said motor to complete said circuit, and relay means responsive to said anode current and adapted to control the operation of said motor.

2. In an electric control system for positioning a motor and of the class comprising an electrical network having a plurality of balance-affecting impedances of which at least one may be varied at will to unbalance said network to a predetermined extent and thereby establish a control signal and of which another may be varied by said motor to re-establish a condition of balance as said motor approaches a predetermined position, detector-relay means responsive to said signal and adapted to influence the operation of said motor in correspondence thereto, said detector-relay means comprising an electron tube having an anode, a cathode and a control electrode, means for impressing a potential representing said signal between said control electrode and said cathode, whereby upon energization of said network from a fluctuating-current source a potential representing unbalance will cause a corresponding current to flow in the anode of said tube, means in the control circuit of said tube and dependent upon the amplitude of said signal potential to bias said control electrode toward a condition of cutoff as said signal is increased, and impedance means included in said network and having a substantially higher value than said variable impedances, whereby circuit failure in said network, if not of a nature to reduce to zero the signal potential impressed upon said detector-relay means, will unbalance the network to a degree to produce an abnormal signal potential substantially greater than could be developed under conditions of extreme unbalance due to the adjustment of said variable impedances, and relay means responsive to said anode current and adapted to control the operation of said motor.

3. In an electric control system for positioning a motor and of the class comprising an electrical network adapted to establish a control signal upon unbalance and having a portion which may be varied by said motor to re-establish a condition of balance, detector-relay means responsive to said signal and adapted to influence the operation of said motor in correspondence thereto, said detector-relay means comprising an electron tube having an anode, a cathode and a control electrode, a coupling transformer having a primary winding adapted to be subjected to said unbalance signal and having two secondary windings, connections for impressing the potential of one of said secondary windings upon said control electrode, a shunt circuit adapted to bypass the alternating component of said potential whereby to increase the threshold of operation of said tube, said shunt circuit including an element normally adapted to inhibit said bypassing action, means in the circuit of said other secondary winding and adapted when the output of said winding exceeds a predetermined voltage to influence said circuit element in a sense to reduce its inhibiting action, thereby causing a greater proportion of said alternating potential to be shunted from said control electrode with a corresponding reduction of the effective amplification of said tube, and relay means responsive to current flow in the anode of said tube for controlling the operation of said motor.

4. In an electric control system for positioning a motor and of the class comprising an electrical network adapted to establish a control signal upon unbalance and having a portion which may be varied by said motor to re-establish a condition of balance, detector-relay means responsive to said signal and adapted to influence the operation of said motor in correspondence thereto, said detector-relay means comprising an electron tube having an anode, a cathode and a control electrode, a coupling transformer having a primary winding adapted to be subjected to said unbalance signal and having a first and a second output winding, connections for impressing upon said control electrode the potential of said first output winding, a shunt circuit adapted to bypass the alternating component of potential impressed upon said electrode and including an asymmetrical non-linear element, circuit means for impressing upon said element a potential to bias the same to a condition of relatively low conductivity, and means in the circuit of said second output winding and adapted to superimpose upon said biasing potential a voltage dependent upon the magnitude of signal impressed upon the primary winding of said coupling transformer and in a sense to reduce the bias upon said element and render the same relatively conductive whereby to increase the bypassing property of said shunt circuit, with a corresponding reduction in the effective amplification of said tube, and relay means responsive to current flow in the anode of said tube for controlling the operation of said motor.

5. In an electric control system for positioning a motor and of the class comprising an electrical network adapted to establish a control signal upon unbalance and having a portion which may be varied by said motor to re-establish a condition of balance, detector-relay means responsive to said signal and adapted to influence the operation of said motor in correspondence thereto, said detector-relay means comprising an electron tube having an anode, a cathode and a control electrode, a coupling transformer having a primary winding adapted to be subjected to said unbalance signal and having a first and a second output winding, connections for impressing upon said control electrode the potential of said first output winding, a shunt circuit adapted to bypass the alternating component of potential impressed upon said electrode and including an asymmetrical non-linear element, circuit means including a voltage-dividing impedance adapted to be subjected to the plate-polarizing voltage of said electron tube and having a tap whereby to apply a portion of said voltage to said non-linear element to bias the same to a condition of relatively low conductivity, and means in the circuit of said second output winding and adapted to superimpose upon said biasing potential a voltage dependent upon the magnitude of signal impressed upon the primary winding of said coupling transformer and in a sense to reduce the bias upon said element and render the same relatively conductive whereby to increase the bypassing property of said shunt circuit, with a corresponding reduction in the effective amplification of said tube, and relay means responsive to current flow in the anode of said tube for controlling the operation of said motor.

6. In an electric control system for positioning a motor and of the class comprising an electrical network adapted to establish a control signal upon unbalance and having a portion which may be varied by said motor to re-establish a condition of balance, detector-relay means responsive to said signal and adapted to influence the operation of said motor in correspondence thereto, said detector-relay means comprising an electron tube having an anode, a cathode and a control electrode, a coupling transformer having a primary winding adapted to be subjected to said unbalance signal and having a first and a second output winding, connections for impressing upon said control electrode the potential of said first output winding, a shunt circuit adapted to bypass the alternating component of potential impressed upon said electrode and including an asymmetrical non-linear element, circuit means comprising a connection between the cathode of said tube and a selected point in said shunt circuit whereby to impress the grid-cathode potential of said tube upon said non-linear element to bias the same to a condition of relatively low conductivity, and means in the circuit of said second output winding and adapted to superimpose upon said biasing potential a voltage dependent upon the magnitude of signal impressed upon the primary winding of said coupling transformer and in a sense to reduce the bias upon said element and render the same relatively conductive whereby to increase the bypassing property of said shunt circuit, with a corresponding reduction in effective amplification of said tube, and relay means responsive to current flow in the anode of said tube for controlling the operation of said motor.

7. In an electric control system for positioning a motor and of the class comprising an electrical network adapted to establish a control signal upon unbalance and having a portion which may be varied by said motor to re-establish a condition of balance, detector-relay means responsive to said signal and adapted to influence the operation of said motor in correspondence thereto, said detector-relay means comprising an electron tube having an anode, a cathode and a control electrode, a coupling transformer having a primary winding adapted to be subjected to said unbalance signal and having a first and a second output winding, connections for impressing upon said control electrode the potential of said first output winding, a shunt circuit adapted to bypass the alternating component of potential impressed upon said electrode and including a diode rectifier, circuit means for normally impressing upon said rectifier a potential to bias the same to a condition of relatively low conductivity, and means in the circuit of said second output winding and adapted to superimpose upon said biasing potential a voltage dependent upon the magnitude of signal impressed upon the primary winding of said coupling transformer and in a sense to reduce the bias upon said rectifier and render the same relatively conductive whereby to increase the bypassing property of said shunt circuit, with a corresponding reduction in the effective amplification of said tube, and relay means responsive to current flow in the anode of said tube for controlling the operation of said motor.

8. In an electric control system for positioning a motor and of the class comprising an electrical network adapted to establish a control signal upon unbalance and having a portion which may be varied by said motor to re-establish a condition of balance, detector-relay means responsive to said signal and adapted to influence the operation of said motor in correspondence thereto, said detector-relay means comprising an electron tube having an anode, a cathode and a control electrode, a coupling transformer having a primary winding adapted to be subjected to said unbalance signal and having a first and a second output winding, connections for impressing upon said control electrode the potential of said first output winding, a shunt circuit adapted to bypass the alternating component of potential impressed upon said electrode and including an asymmetrical non-linear element, circuit means for impressing upon said element a potential to bias the same to a condition of relatively low conductivity, and means in the circuit of said second output winding and including a rectifier energized from said winding and connected to said biasing circuit to superimpose upon said biasing potential a voltage dependent upon the magnitude of signal impressed upon the primary winding of said coupling transformer and in a sense to reduce the bias upon said element and render the same relatively conductive whereby to increase the bypassing property of said shunt circuit, with a corresponding reduction in the effective amplification of said tube, and relay means responsive to current flow in the anode of said tube for controlling the operation of said motor.

9. In an electric control system for positioning a motor and of the class comprising an electrical network adapted to establish a potential upon unbalance and having a portion which may be varied by said motor to re-establish a condition of balance, means for detecting and amplifying said unbalance potential, said detecting and amplifying means comprising an electron tube having an anode, a cathode and a control electrode, connections for impressing between said control electrode and said cathode a potential representative of said unbalance potential whereby upon energization of said network from a fluc- tuating-current source a current corresponding to said unbalance potential will flow in the anode of said tube, relay means responsive to said anode current for energizing said motor, and means responsive to an abnormal potential from said network for biasing said control electrode to cut-off condition wherein energization of said motor is prevented.

10. In an electric control system for positioning a motor and of the class comprising an electrical network adapted to establish a potential upon unbalance and having a portion which may be varied by said motor to re-establish a condition of balance, means for detecting and amplifying said unbalance potential, said detecting and amplifying means comprising an electron tube having an anode, a cathode and a control electrode, connections for impressing between said control electrode and said cathode a potential representative of said unbalance potential whereby upon energization of said network from a fluctuating-current source a current corresponding to said unbalance potential will flow in the anode of said tube, relay means responsive to said anode current for energizing said motor, and resistance means responsive to an abnormal potential from said network for desensitizing said detecting and amplifying means.

11. In an electric control system for positioning a motor and of the class comprising an electrical network adapted to establish a potential upon unbalance and having a portion which may be varied by said motor to re-establish a condition of balance, means for detecting and amplifying said unbalance potential, said detecting and amplifying means comprising an electron tube having an anode, a cathode and a control electrode, connections for impressing between said control electrode and said cathode a potential representative of said unbalance potential whereby upon energization of said network from a fluctuating-current source a current corresponding to said unbalance potential will flow in the anode of said tube, relay means responsive to said anode current for energizing said motor, and means responsive to an abnormal potential from said network for establishing a shunt circuit by-passing said control electrode to desensitize said detecting and amplifying means.

12. In an electric control system for positioning a motor and of the class comprising an electrical network adapted to establish a potential upon unbalance and having a portion which may be varied by said motor to re-establish a condition of balance, an electron tube for detecting and amplifying a potential representative of said unbalance potential, said tube having an anode, a cathode, and a control electrode, connections for impressing between said control electrode and said cathode a potential representative of said unbalance potential whereby upon energization of said network from a fluctuating-current source an amplified current corresponding to said unbalance potential will flow in the anode of said tube, a second electron tube having an anode, a cathode, and a control electrode, means connected to the anode of said first tube for applying between the control electrode and cathode of the second tube a potential representative of said unbalance potential for causing a further amplified current corresponding to said unbalance potential to flow in the anode of said second tube, relay means controlled by the last-mentioned current for energizing said motor, means comprising a condenser and resistor in parallel between the control electrode and cathode of the second tube and responsive to flow of current between said cathode and control electrode for biasing said control electrode to cut-off condition wherein energization of said motor is prevented until leakage of the charge of said condenser through said resistor reduces said bias below cut-off condition, and relay means energized concurrently with said motor for decreasing the sensitivity of one of said tubes during operation of said motor.

13. The combination defined by claim 12, wherein the last mentioned relay means decreases the sensitivity of the second tube by establishing a connection between the control electrode and anode of said tube.

14. The combination defined by claim 12, wherein the last mentioned relay means decreases the sensitivity of the first tube by raising the bias of its cathode.

15. In an electric control system for positioning a motor and of the class comprising an electrical network adapted to establish a potential upon unbalance and having a portion which may be varied by said motor to re-establish a condition of balance, an electron tube for detecting and amplifying a potential representative of said unbalance potential, said tube having an anode, a cathode, and a control electrode, connections for impressing between said control electrode and said cathode a potential representative of said unbalance potential whereby upon energization of said network from a fluctuating-current source an amplified current corresponding to said unbalance potential will flow in the anode of said tube, a second electron tube having an anode, a cathode, and a control electrode, means connected to the anode of said first tube for applying between the control electrode and cathode of the second tube a potential representative of said unbalance potential for causing a further amplified current corresponding to said unbalance potential to flow in the anode of said second tube, relay means controlled by the last-mentioned current for energizing said motor, means comprising a condenser and resistor in parallel between the control electrode and cathode of the second tube and responsive to flow of current between said cathode and control electrode for biasing said control electrode to cut-off condition wherein energization of said motor is prevented until leakage of the charge of said condenser through said resistor reduces said bias below cut-off condition, and means comprising a resistor connected to the control electrode of one of said tubes and to the first mentioned resistor and condenser for desensitizing said tube in response to an abnormal potential in said network.

16. In an electric control system for positioning a motor and of the class comprising an electrical network adapted to establish a potential upon unbalance and having a portion which may be varied by said motor to re-establish a condition of balance, means for detecting and amplifying said unbalance potential, said detecting and amplifying means comprising an electron tube having an anode, a cathode and a control electrode, connections for impressing between said control electrode and said cathode a potential representative of said unbalance potential whereby upon energization of said network from a fluctuating-current source a current corresponding to said unbalance potential will flow in the anode of said tube, relay means responsive to said anode current for energizing said motor, said detecting and amplifying means including resistance means responsive to an abnormal potential from said network for desensitizing said detecting and amplifying means.

17. In an electric control system for positioning a motor in response to an electrical signal potential of variable amplitude, electronic means for detecting and amplifying said signal and including a cathode, an anode and a control electrode, relay means controlled by said electronic means and directionally responsive thereto according to the sense of said signal and comprising two contacts and a coacting member adapted for electrical engagement therewith according to the direction of response of said relay means, whereby to connect one or the other of said two contacts to one side of a source of electric potential, two motor control circuits, each with two terminals, one terminal of each being connected to said contacts respectively and the remaining terminals being adapted for common connection to the other side of said source of potential, a circuit directly connecting said two contacts and having an impedance substantially higher than that of said motor control circuits and provided with a tap intermediate said contacts whereby to constitute a potential-divider therebetween, and an electrical connection between said tap and the control electrode of said electronic means whereby to superimpose upon said signal potential a modifying potential derived from said tap concurrently with the operation of said relay.

18. In an electric control system for positioning a motor in response to an electrical signal potential of variable amplitude, electronic means for detecting and amplifying said signal and including a cathode, an anode and a control electrode, relay means controlled by said electronic means and directionally responsive thereto according to the sense of said signal and comprising two contacts and a coacting member adapted for electrical engagement therewith according to the direction of response of said relay means, whereby to connect one or the other of said two contacts to one side of a source of electric potential, two motor control circuits, each with two terminals, one terminal of each being connected to said contacts respectively and the remaining terminals being adapted for common connection to the other side of said source of potential, a circuit directly connecting said two contacts and having an impedance substantially higher than that of said motor control circuits and provided with a tap intermediate said contacts whereby to constitute a potential-divider therebetween, means including a capacitor connected between said tap and the control electrode of said electronic means for superimposing upon said signal potential a modifying potential derived from said tap concurrently with the operation of said relay, and means for imparting an asymmetrical characteristic to the charging and discharging of said capacitor.

19. In electrical control apparatus for controlling the position of a movable element and of the class including a balanceable network having at least two variable impedances one of which may be varied independently of conditions in said network, motor means adapted to move said element and incidentally to adjust the other of said two impedances to affect the balance of the network, terminals at discrete points in said network and adapted to be subjected to a potential difference for energizing the same, detector-relay means connected to said network at other discrete points and responsive to potentials evolving from normal unbalance conditions introduced by changes in said variable impedances to activate said motor means to move said element and incidentally to adjust said other impedance in a sense to restore in said network a balance disturbed by variation of said first variable impedance; the improvement comprising further impedance components included in said network whereby the total impedance thereof is substantially greater than any possible variation due to changes in said variable impedances, voltage-sensitive means adapted to inhibit response of said detector-relay means to unbalance conditions, and electrical connections for impressing upon said voltage-sensitive means potential differences resulting from extreme unbalance conditions attendant upon defects in said impedances or connections therebetween.

20. In electrical control apparatus for controlling the position of a movable element and of the class including a balanceable network having at least two variable impedances one of which may be varied independently of conditions in said network, motor means adapted to move said element and incidentally to adjust the other of said two impedances to affect the balance of said network, terminals at discrete points in said network and adapted to be subjected to an alternating potential difference for energizing the same, detector-relay means connected to said network at other discrete points and responsive to alternating potentials evolving from normal unbalance conditions introduced by changes in said variable impedances to activate said motor means to move said element and incidentally to adjust said other impedance in a sense to restore in said network a balance disturbed by variation of said first variable impedance; the improvement comprising further impedance components included in said network whereby the total impedance thereof is substantially higher than any possible variation due to changes in said variable impedances, unidirectional voltage sensitive means adapted to inhibit response of said detector-relay means to said alternating unbalance potentials, and means for impressing upon said voltage-sensitive means unidirectional potentials corresponding to voltages resulting from extreme unbalance conditions attendant upon defects in said impedances or connections therebetween.

21. In electrical control apparatus for controlling the position of a movable element and of the class including a balanceable network having at least two variable impedances one of which may be varied independently of conditions in said network, motor means adapted to move said element and incidentally to adjust the other of said two impedances to affect the balance of said network, terminals at two discrete points in said network and adapted to be subjected to a potential difference for energizing the same, detector-relay means connected to said network at other discrete points and comprising an electron discharge device having an anode, a cathode and a control electrode responsive to potential between said other discrete points due to normal unbalance conditions introduced by changes in said variable impedances to activate said motor means to move said element and incidentally to adjust said other impedance in a sense to restore in said network a balance disturbed by variation of said first variable impedance; the improvement comprising further impedance components included in said network whereby the total impedance thereof is substantially greater than any possible variation due to changes in said variable impedances, a shunt member having conductivity dependent upon voltage impressed thereon and connected between said cathode and said control electrode, means for normally maintaining said shunt member in a substantially non-conductive state, and electrical connections for impressing upon said shunt member potential differences resulting from extreme unbalance conditions attendant upon defects in said impedances or connections therebetween whereby to render said member relatively conductive and inhibit the response of said electron discharge device to potentials representing normal unbalance conditions.

22. In an electrical control system of the class embodying a network including two variable potential-dividing elements variation of either of which may affect the balance of said network and wherein a balance condition disturbed by variation of one of said elements may be restored by variation of the other, mechanical means for varying said other element to affect said network balance, motor means for activating said mechanical means, means for controlling the operation of said motor means and including an electron discharge device having an anode, a cathode and a control electrode, circuit means for impressing between said cathode and said control electrode an electrical potential representative of the unbalance of said network, a voltage-sensitive variable impedance element connected between said cathode and said control electrode, means connected to said network and rendered operative by an unbalance condition other than that introduced by relative variation of said potential-dividing elements to apply to said last-named impedance element a potential whereby to reduce the impedance of the same and shunt said cathode and control electrode to a degree substantially inhibiting response of said electron discharge device to potentials impressed therebetween.

References Cited in the file of this patent

UNITED STATES PATENTS

| | | |
|---|---|---|
| 2,040,014 | Moseley | May 5, 1936 |
| 2,085,128 | Staege | June 29, 1937 |
| 2,115,834 | Young | May 3, 1938 |
| 2,147,674 | Satterlee | Feb. 21, 1939 |
| 2,154,375 | Chambers | Apr. 11, 1939 |
| 2,209,369 | Wills | July 30, 1940 |
| 2,287,002 | Moseley | June 16, 1942 |
| 2,364,483 | Side | Dec. 5, 1944 |
| 2,426,711 | Shaffer | Sept. 2, 1947 |
| 2,454,401 | Nygaard | Nov. 23, 1948 |
| 2,475,457 | Nygaard | July 5, 1949 |
| 2,475,461 | Roberts | July 5, 1949 |
| 2,528,054 | Harrison | Oct. 31, 1950 |
| 2,534,801 | Siltamaki | Dec. 19, 1950 |